United States Patent Office 3,544,617
Patented Dec. 1, 1970

3,544,617
PROCESS FOR THE MANUFACTURE OF
AROMATIC NITRILES
Taijiro Oga, Hideo Ichinokawa, and Masatomo Ito,
Tokyo, Japan, assignors to Showa Denko Kabushiki
Kaisha, Tokyo, Japan
No Drawing. Filed Dec. 27, 1967, Ser. No. 693,708
Int. Cl. C07c *121/04, 121/52, 121/56*
U.S. Cl. 260—465
16 Claims

ABSTRACT OF THE DISCLOSURE

A process for the production of aromatic nitriles by ammoxidation of an alkyl substituted benzene using a catalyst comprising oxide of vanadium on a carrier. The carrier is prepared by mixing 20–100μ α-alumina with hydrous aluminum silicate or titanium oxide, molding and cancinating at 800–1700° C.

BACKGROUND OF THE INVENTION

Field of the invention

The present invention relates to the manufacture of aromatic nitriles, and more especially to the manufacture of them efficiently by the ammoxidation of aromatic compounds containing at least one alkyl group in the presence of a vanadium oxide catalyst supported on a carrier which is prepared by mixing 20–100μ α-alumina powder with 5–100% by weight of hydrous aluminum silicate and/or titanium oxide, molding the resulting mixture, calcinating at 800–1700° C., and then supporting the vanadium oxide component on the resulting carrier.

Description of the prior art

It is known that the aromatic compounds containing at least one alkyl group are converted into the corresponding aromatic nitriles by ammoxidation, namely, catalytic reaction, in gas phase using a mixed gas containing ammonia and molecular oxygen, where vanadium oxide supported on a heat-treated active alumina at 1000–1500° C. (described in United States Pat. No. 2,838,558) or on γ-, δ-, η-, k-, or χ-alumina are used as catalysts, as described in United States Pat. No. 3,278,573.

However, in these reactions, hydrogen cyanide and other colored materials are unavoidably formed as by-products as the result of undesirable decomposition based on an excess oxidation reaction when using the catalysts described above. As a result, the conversion rate of the desired nitriles is in general lower. Furthermore, much excess ammonia is used owing to the decomposition of the ammonia and this causes a decrease in the yield based on ammonia.

It is an object of this invention to provide a process by which aromatic nitriles are obtained in higher yield than by prior art methods. Another object of this invention is to provide a process by which aromatic nitriles are obtained in higher purity than hitherto. A further object of the invention is to provide a process for making aromatic nitriles in excellent high yields based on the amount of ammonia used, by controlling the excess oxidation of the ammonia.

SUMMARY OF THE INVENTION

We, the inventors of this invention, have found that abnormal decomposition, and excess decomposition of the ammonia owing to an excessive oxidation reaction, and reaction velocity are each closely related to the structure of the carrier used to support the catalyst components. We have also noticed that as the carrier, porous ones having porous diameter of 1–50μ are substantially proper for the progress of the reaction.

Further, more in detail, when employing a vanadium oxide catalyst supported on α-alumina having porous diameter of 1–50μ which occupies the greater part of the total porous volume, namely, more than 70% by volume, and also having more than 30% porosity, preferably 40–60%, the preparation of nitriles by ammoxidation is efficiently carried out, and control is exercised over both the excess decomposition and the practical reaction velocity, and this is the basis of our invention.

In the case of using a carrier, of which the greater part of the pores are ones of less than 1μ in diameter, excess oxidation occurs owing to the acceleration of the undesirable oxidation reaction in the pores. On the other hand, reaction velocity applicable to industrial scale operation is not observed when using a carrier of which the greater part of the pores are ones of more than 50μ in diameter.

DETAILED DESCRIPTION OF THE INVENTION

As indicated above, this invention relates to using a vanadium oxide catalyst supported on the α-alumina carrier, of which more than 70% of the total pore volume is pores of 1–50μ diameter pore, in the preparation of aromatic nitriles by the ammoxidation of aromatic compounds containing at least one alkyl group.

The carrier which is preferably used in this invention and has a specific porous structure can be prepared by the following procedure.

Into a mixture of α-alumina consisting of sintered alumina or fused alumina and hydrous aluminum silicate and/or titanium oxide, high temperature sublimating material, such as, stearic acid, camphor and ammonium chloride, or high temperature decomposing and easily volatilizing material, such as, aluminum stearate are, if desired, added, thoroughly mixed, molded and then calcinated at 800–1700° C. The diameter of the pores, distribution, porosity thereof and so on can be adjusted by the granularity of the materials used, the mixing ratio of the hydrous aluminum silicate and/or titanium oxide, and the calcinating temperature.

Typical carrier material having the desired porous structure may be prepared by mixing α-alumina of 20–100μ size with 5–100% by weight of hydrous aluminum silicate and/or titanium oxide, molding and then calcinating the resulting mixture at 800–1700° C.

Porosity may be decreased when the size of α-alumina powder is less than 20μ, and on the other hand, when the size is more than 100μ, the carrier formed has many pores of more than 50μ, and as a result, the desired carrier is not obtained.

In the case of using sintered alumina or fused alumina as the α-alumina, a preferred carrier can be prepared because the properties of the alumina are scarcely changed, even by heating at high temperatures.

Kaolinite, Halloysite, Nacrite and Dickite may be used as the hydrous aluminum silicate, and among them Kaolinite and Holloysite are especially suitable for use.

This hydrous aluminum silicate is used in an amount of 5–100% by weight, especially 10–50% by weight, based on the α-alumina. In the case of using a smaller amount of the hydrous aluminum silicate, the carrier thus obtained is not strong enough, and on the contrary, in the case using a larger amount of the hydrous aluminum silicate, the carrier has much lower porosity and many more pores of less than 1μ.

It is an advantage that the carrier obtained has excellent mechanical strength and in addition, catalytic activity is hardly affected owing to the amount of the hydrous aluminum silicate added, when using the hydrous aluminum silicate as one of the carrier components.

Titanium oxide may be used as both the anatase and rutile types, but the anatase type is much better because of its sintering properties. Titanium oxide itself has little activity as a catalyst, but when used as one component of the carrier in the presence of α-alumina, it shows catalytic activity together with the vanadium catalyst. As a result, the reaction temperature tends to be decreased.

In the case where the sintering temperature is high, pore diameter is increased on the average, and consequently porosity tends to be decreased.

The diameter and distribution pores, and porosity of the pores of the carrier thus obtained can be measured by the following conventional means.

Distribution of the pores, and porosity are each measured by the mercury compression method, and helium-mercury substitution method.

Alumina, silicon carbide, titania, pumice and the like are disclosed as catalyst carriers for use in the preparation of aromatic nitriles by conventional ammoxidation methods. Among them, the alumina carrier is, for example, measured for porosity, and used as a conventional carrier described in the literature for the preparation of nitriles, and the results are shown in the following table.

| Type of alumina | Pore diameter range,[1] μ | Percent Porosity | Yield benzonitrile |
|---|---|---|---|
| Active alumina (Neobead type) | 0.003–0.05 | 50 | 32 |
| Active alumina (γ-type) | 0.01–0.1 | 50 | 45 |
| Active alumina heat treated at 1300° C. (α-type) | 0.05–0.5 | 54 | 44 |

[1] Occupying 70% of total volume.

The catalyst carriers of the invention do not show nearly the activity in ammoxidation like the conventional carriers described above, but after supporting vanadium oxide catalyst thereon, effective activity is admitted for the first time. Both vanadium oxide itself or a mixture of vanadium oxide, as the main component, and other oxides, such as, chrome, arsenic, selenium, sulfur and antimony are effectively used as catalyst components. These catalyst components can be used in a wide range based on the support, and 5–20% by weight of them is desirable. Where mixtures of vanadium oxide and other oxides, such as, chrome, arsenic, selenium, sulfur and antimony oxides are employed, the atomic ratio of vanadium to the other metal ion of the mixture is preferably as follows:

V/Cr—from 2:1 to 1:4
V/As—from 3:1 to 1:2
V/Se—from 3:1 to 1:2
V/S—from 3:1 to 1:4
V/Sb—from 2:1 to 1:4

The catalysts of the invention may be employed for fixed beds and fluidized beds respectively.

Besides, the usual conditions in such ammoxidation reactions can be applied to our invention without much change from the conventional ones. As a result, an increase of more than 10–15% of yield in the preparation of the desired nitriles is realized.

The application and manipulating conditions of the invention will be more fully illustrated in the following description.

Aromatic compounds containing at least one alkyl group used in the invention include benzene, halogen-substituted benzene, nitrile-substituted benzene and pyrridine series, of which the nucleus is substituted with at least one lower alkyl group. The lower alkyl group represents methyl, ethyl, isopropyl groups, etc., and halogen represents fluorine, chlorine, etc.

As for aromatic nitriles as products, benzonitrile is obtained from toluene and ethylbenzene; p-chloro benzonitrile from p-chloro toluene; 2,6-dichloro benzonitrile from 2,6-dichloro toluene; isophthalonitrile from m-xylene and m-tolunitrile; m-tolunitrile and isophthalonitrile from m-xylene; p-tolunitrile and terephthalonitrile from p-xylene and p-cymene; o-tolunitrile, phthalonitrile and phthalimido from o-xylene; picolinonitrile from α-picoline; nicotinonitrile from β-picoline; isonicotinonitrile from γ-picoline; and 2,5-dicyano-pyrridine; and nicotino nitrile from 2-methyl-5-ethyl pyrridine, each may be mentioned. It is also possible that these aromatic compounds may optionally be mixed to use as starting materials, and resultingly, mixtures of the corresponding nitriles are manufactured.

The concentration of the aromatic compounds in the reaction gas may be varied over a wide range, although the range is more or less changed according to the type of the compounds used. It is suitable to select the specific range in which a non-explosive mixture is formed, because the content of ammonia and oxygen cause an easily explosive mixture to be formed. When using air as an oxygen source, it is preferable to select desirable amounts from the range of 0.5–100% by volume. In the prior art, less than 1–1.5% of the aromatic compound is mainly used, but in this invention, much higher concentrations than the amounts, as well as the amounts shown in the prior art, also may be used to prepare the desired nitriles in high yields while still maintaining the proper catalytic activity.

The concentration of ammonia in the reactant gas is varied due to the kind and concentration of the aromatic compounds and the concentration of oxygen employed. According to conventional methods, ammonia is usually used in an amount of 3–4 moles per mole of alkyl group. However, 1 mole of ammonia can be used per mole of the alkyl group in order to make the nitriles in fairly high yields according to the invention. In general, about two times of the theoretical amount is especially suitable, that is to say, relatively small amounts of ammonia are used in this invention.

The concentration of oxygen in the reactant gas may be varied due to the kind and concentration of the aromatic compounds. However, at least a theoretical amount is necessary, and more than 1.5 times the amount is practical.

The reaction of the invention may be carried out at a temperature in the range of 250–500° C. When the reaction is carried out at less than 250° C., or more than 500° C., the reaction yield is not good. A most typical temperature range is at 300–450° C., and the preferred temperature is optionally chosen from these ranges according to the type and concentration of the aromatic compounds, and contact time, etc. The contact time may be varied due to the gas composition and reaction temperatures, but fairly wide ranges can be applied. A typical contact time is from 0.5 to 20 seconds. The reaction ordinarily proceeds at a pressure of from atmospheric pressure to 5 atms., but it may proceed at any other subatmospheric and super atmospheric pressure.

The reaction gas product formed in the invention is cooled by conventional means, such as an air or water condenser, ice or dry ice trap and so on, and the resulting cooled nitriles are recovered as a liquid or solid upon condensation or solidification.

The invention will be more readily understood by illustration to the following examples:

EXAMPLE 1

Both 15 parts of purified Kaolinite and 5 parts of stearic acid are added to 110 parts of α-alumina having a size of 200–250 mesh, and thoroughly mixed. Into the mixture thus obtained is added 4 parts of ethylene glycol to wet. The mixture is granulated to make granules having a size of 20–40 mesh. The mixture is then molded by a tableting machine to make cylindrical moldings having 3 mm. diameter. The moldings are heated to 1600° C., during 3 hours in a stream of air, and are further heated at 1600° C. for 30 minutes in order to prepare the desired carrier which has 44% porosity and of which 87% of the total pore volume is occupied by pores having 1–50μ diameters.

To 300 g. of the carrier so formed, there is added 72 ml. of an aqueous vanadyl oxalate solution obtained from 31 g. of vanadium pentoxide. The solution is absorbed and the mixture is dried and then heated at 550° C., for 6 hours in a stream of air. The resulting catalyst is packed in a reactor having a 25 mm. diameter, and a gaseous mixture containing 1.5% of toluene, 4.0% of ammonia and air is contacted with the catalyst at 415° C., for 3.6 seconds. This gives benzonitrile in a yield of 80% based on toluene, and 63% based on consumed ammonia, respectively.

molded. The resulting cylindrical moldings having 4 mm. diameter are heated to 1600° C., for 3 hours in a stream of air, and further heated at 1600° C., for 30 minutes. This gives a carrier which has 51% porosity and of which total 75% of the pore volume is occupied with pores having 1–50 micron diameters.

10% by weight of vanadium oxide and antimony oxide are supported on the carrier, and the catalyst so formed is used for ammoxidation of the following hydrocarbons.

| Hydrocarbons | Conc. of hydrocarbon, percent | Conc. of ammonia, percent | Reaction temp., ° C. | Yield of nitrile, percent |
| --- | --- | --- | --- | --- |
| Ethyl benzene | 2.0 | 6 | 394 | 93 |
| Isopropylbenzene | 1.8 | 6 | 394 | 85 |
| p-Xylene | 1.5 | 8.0 | 394 | [1] 90 |
| p-Chlorotoluene | 2.3 | 6 | 394 | 88 |
| m-Tolunitrile | 1.6 | 4.5 | 394 | 96 |
| β-Picoline | 2.0 | 5 | 394 | 85 |
| 2-methyl-5-ethyl pyridine | 1.5 | 8.0 | 394 | [2] 38 |

[1] Indicates a 2% content of p-tolunitrile.
[2] Indicates a content of both 47% of 2,5-dicyanopyridine and 36% of nicotinonitrile.

COMPARATIVE EXAMPLE

Cylindrical active alumina having 3 mm. diameter is heated at 1300° C., for 22 hours. The resulting carrier has 54% porosity, of which total 90% of the pore volume is occupied with pores having 0.05–0.5μ diameters. Similarly, Alundum powder is calcinated to give an Alundum (registered trademark) carrier having 36% porosity, of which total 80% of the pore volume is occupied with pores having 50–200μ diameters.

Proceeding in the same manner described in Example 1, 10% by weight of vanadium pentoxide is supported on these carriers, and the resulting catalysts are employed for ammoxidation using the same procedure given in Example 1. The results are shown in the following table.

| Carrier | Reaction temp., ° C. | Yield (benzonitrile), percent Based on toluene | Yield (benzonitrile), percent Based on ammonia |
| --- | --- | --- | --- |
| Active alumina heated at 1,300° C. | 400 | 42 | 36 |
| Alundum | 430 | 66 | 45 |

EXAMPLE 2

5 parts of stearic acid is added to a mixture of 25 parts of titanium oxide powder having a size of 200–300 mesh and 75 parts of α-alumina powder having a size of 200–250 mesh and is thoroughly mixed. The resulting powder is molded. The cylindrical moldings having 3 mm. diameter are heated to 1300° C. for 3 hours in a stream of air, are further heated at 1300° C. for 20 minutes, and this affords a carrier which has 41% porosity and of which total 80% of the pore volume is occupied with pores having 1–50 micron diameters.

Onto the carrier (250 g.) thus obtained, each of the catalyst components shown in the following Table 1 are deposited, and then used as catalyst for the preparation of isophthalonitrile using a mixed gas consisting of 1.5% of m-xylene, 7.5% of ammonia and 91.0% of air, where contact time is 3.6 seconds. The results are indicated in the following Table 1.

TABLE 1

| Catalyst component | Amount carried (percent by weight) | Reaction temp., ° C. | Yield (percent) isophthalo-nitrile | Yield (percent) based on NH³ |
| --- | --- | --- | --- | --- |
| Vanadium oxide-antimony oxide (V:Sb=1:1) in atomic ratio | 10 | 392 | 86.3 | 65 |
| Vanadium oxide-arsenic oxide (V:As=2:1) | 10 | 386 | 83.5 | 61 |
| Vanadium oxide-chromium oxide (V:Cr=1:1) | 10 | 382 | 83.6 | 64 |
| Vanadium oxide-sulfur trioxide-cobalt sulfate (V:S:Co=2:3:1) | 10 | 385 | 84.0 | 57 |
| Vanadium oxide-selenium oxide (V:Se=1:1) | 10 | 380 | 80.3 | 56 |

EXAMPLE 3

10 parts of Hallysite is added to 80 parts of α-alumina having a size of 200–250 mesh, mixed thoroughly, and then 5 parts of stearic acid is added with mixing, and

What is claimed is:

1. In a process for the manufacture of aromatic nitriles by reacting (a) an aromatic compound selected from the group consisting of alkyl-substituted benzenes with 1 to 3 alkyl groups of 1 to 3 carbon atoms with (b) an oxygen containing gas and (c) ammonia at a temperature in the range of from 250 to 500° C., the improvement comprising contacting the reactants with a catalyst prepared by mixing α-alumina having a size of 20–100μ with 5–100% by weight of at least one material selected from the group consisting of hydrous aluminum silicate and titanium oxide, calcinating the resulting mixture at about 800 to about 1700° C. to form a carrier material, and depositing on said carrier material an active component selected from the group consisting of vanadium oxide, and mixtures of vanadium oxide with chromium, arsenic, selenium, sulfur or antimony oxides.

2. A process as claimed in claim 1 wherein the active component of the catalyst is a mixture of vanadium oxide and chromium oxide in an atomic ratio of vanadium to chromium of from 2:1 to 1:4.

3. A process as claimed in claim 1 wherein the active component of the catalyst is a mixture of vanadium oxide and arsenic oxide in an atomic ratio of vanadium to arsenic of from 3:1 to 1:2.

4. A process as claimed in claim 1 wherein the active component of the catalyst is a mixture of vanadium oxide and selenium oxide in which the atomic ratio of vanadium to selenium is from 3:1 to 1:2.

5. A process as claimed in claim 1 wherein the active component of the catalyst is a mixture of vanadium and sulphur oxide in which the atomic ratio of vanadium to sulfur is from 3:1 to 1:4.

6. A process as claimed in claim 1 wherein the active component of the catalyst is a mixture of vanadium oxide and antimony in which the atomic ratio of vanadium to antimony is from 2:1 to 1:4.

7. A process as claimed in claim 1 wherein the alkyl-substituted benzene is toluene.

8. A process as claimed in claim 1 wherein the alkyl-substituted benzene is xylene.

9. The process of claim 1 wherein said catalyst carrier material, after calcining, comprises pores of a diameter of 1–50μ.

10. The process of claim 9 wherein greater than 70% of the pores of said catalyst have a diameter within said range.

11. The process of claim 9 wherein said catalyst has a porosity greater than 30%.

12. The process of claim 1 which further comprises between mixing said materials and calcining said materials, molding said materials.

13. The process of claim 1 wherein said α-alumina is sintered alumina or fused alumina.

14. The process of claim 1 wherein from 5–20% of the catalyst comprises said active component, based in said carrier material.

15. The process of claim 1 wherein said ammonia is present in an amount greater than 1 mole per mole of alkyl group, oxygen is present in an amount at least equal to that theoretically required for reaction, and the temperature is 300–450° C.

16. The process of claim 1 wherein said alkyl-substituted benzene is a member selected from the group of halogen-substituted benzenes and nitrile-substituted benzenes.

References Cited

UNITED STATES PATENTS

| 2,838,558 | 6/1958 | Hadley et al. | 260—465 |
| 2,987,538 | 6/1961 | Gasson | 260—465 |
| 3,278,573 | 10/1966 | Kroeper et al. | 260—465 |
| 3,355,479 | 11/1967 | Oga et al. | 260—465 |

FOREIGN PATENTS

| 40/22,256 | 10/1965 | Japan. |
| 40/22,738 | 10/1965 | Japan. |

CHARLES B. PARKER, Primary Examiner

D. H. TORRENCE, Assistant Examiner

U.S. Cl. X.R.

23—151; 252—439, 455, 461, 463, 464, 465, 467; 260—294.9, 558